United States Patent
Chen et al.

(10) Patent No.: US 6,804,036 B1
(45) Date of Patent: Oct. 12, 2004

(54) OPTICAL SWITCH

(75) Inventors: Wen-Chih Chen, Yilan (TW); Chia-Yu Wu, Kaohsiung (TW); Chengkuo Lee, Taipei (TW)

(73) Assignee: Asia Pacific Microsystems, Inc., Hsinchu (TW)

( * ) Notice: Subject to any disclaimer, the term of this patent is extended or adjusted under 35 U.S.C. 154(b) by 0 days.

(21) Appl. No.: 10/642,218

(22) Filed: Aug. 18, 2003

(51) Int. Cl.[7] .............................. G02B 26/00; G02F 1/00
(52) U.S. Cl. ...................... 359/237; 359/290; 359/291; 359/117; 359/320; 385/16; 385/17
(58) Field of Search ................................ 359/117, 128, 359/147, 115, 223, 237, 290, 291, 227, 230, 234, 315, 320; 385/16, 17, 18, 22, 140, 141; 398/12, 19, 13, 20, 17, 18, 16

(56) References Cited

U.S. PATENT DOCUMENTS

| | | | |
|---|---|---|---|
| 5,175,780 A | * 12/1992 | Sano et al. | .................... 385/47 |
| 6,229,640 B1 | * 5/2001 | Zhang | ......................... 359/290 |
| 6,315,462 B1 | * 11/2001 | Anthamatten et al. | ........ 385/83 |
| 6,614,570 B2 | * 9/2003 | Johnson et al. | ............. 359/230 |
| 2003/0161574 A1 | * 8/2003 | Aksyuk et al. | ............... 385/16 |

* cited by examiner

Primary Examiner—Ricky Mack
Assistant Examiner—Brandi Thomas
(74) Attorney, Agent, or Firm—Troxell Law Office PLLC

(57) ABSTRACT

Disclosed is an optical switch using V-beam electrothermal actuators, buckle beam springs, and movement translation mechanism with its bi-directional movable latched function for optical communication applications. In the preferred embodiments, various layout combinations of the V-beam electrothermal actuators, the buckle beam springs, a reflective mirror shutter connected to a shutter beam, and spatial joint to enable various operation approaches to realize the bi-stable switching function without external electrical load and electrical power consumption of said optical switch regarding the input optical signals transmitting toward the output channels, or the input optical signals transmitting forward to the reflective mirror shutter and then being reflected toward the output channel. The forward moving displacement generated by electrothermal V-beam actuators will move the shutter beam and reflective mirror shutter from one stable position to another stable position of the bi-stable positions of latched optical switch. The buckle beam springs exert spring force due to its natural deflection onto the shutter beam against the force from actuators, environment vibrations, and shocks, etc.; thus the optical switch performs the latch function with any external electrical load and electrical power consumption.

19 Claims, 16 Drawing Sheets

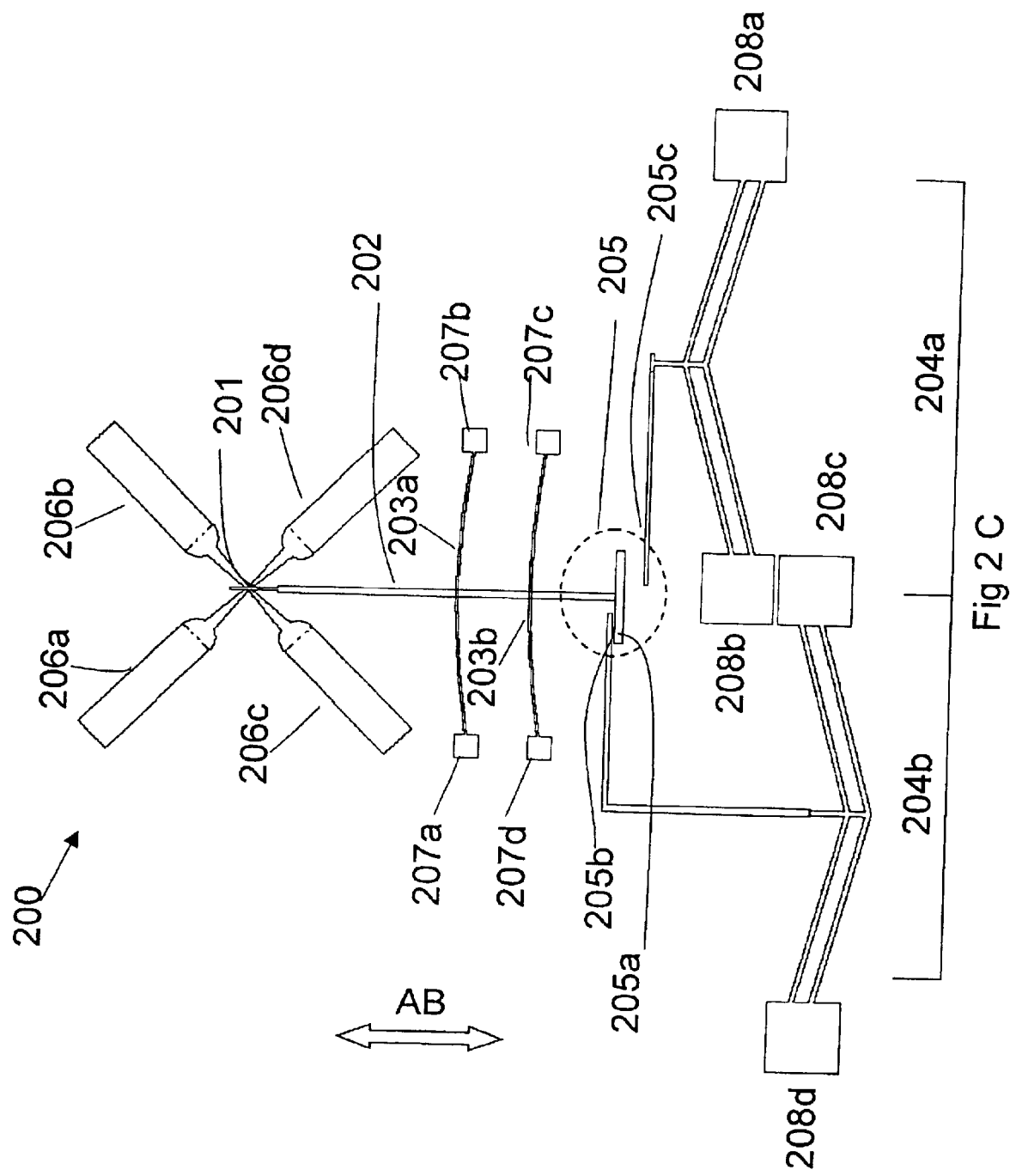

OPTICAL SWITCH

BACKGROUND OF THE INVENTION

Field of the invention

This present invention relates to an optical switch and in particular to an optical switch based on V-beam electrothermal actuators and bi-directional movable latched mechanism.

Optical switches can be applied to telecommunication network for bandwidth provisioning, add/drop multiplexing, network protection and network monitoring, etc. Optical switching technology's main advantage is to route optical data signals without conversion to electrical signals, resulting in the independence of data rate and data protocol. An optical switch typically has a mirror to be switched into and out of a path of an optical signal beam. Switches can often be categorized into "latch" and "non-latch". In a latched optical switch, the mirror reliably remains in a known position of the on or off state of optical switch, even if the external electrical load is removed or lost. On the other hand, a non-latched switch may revert to an unknown position, or even to a position between the switching states, when the external electrical load is removed or lost. Optical switches are typically defined by the number of input and output ports, referred to as N×M. Considerable interest has recently been shown in using the MEMS (microelectromechanical systems) technology to make optical switches. Combining the comb-drive actuator with the silicon-on-insulator (SOI), deep-reactive-ion-etching (DRIE) process, and subsequently wet etching process, the MEMS based optical switch devices have been prepared and characterized by, for example, W. Noell, et al., "Applications of SOI-Based Optical MEMS", IEEE J. on Selected Topics in Quantum Electronics, Vol. 8, No. 1, January/February 2002, pp. 148–154; C. Marxer and N. F. de Rooij, "Micro-Opto-Mechanical 2×2 Switch for Single-Mode Fibers Based on Plasma-Etched Silicon Mirror and Electrostatic Actuation", IEEE J. of Lightwave Technology, vol. 17, No. 1, 1999, pp.2–8; W.-H. Juan and S. W. Pang, "High-Aspect-Ratio Si Vertical Micromirror Arrays for Optical Switching", IEEE J. Microelectromechanical Systems Vol. 7, No. 2, 1998, pp.207–213. Prior arts of U.S. Pat. No. 6,315,462, "Fiber Optic Circuit Switch and A Process for Its Production," of O. Anthamatten and C. Marxer; and U.S. Pat. No. 6,229,640, "Microelectromechanical Optical Switch and Method of Manufacture Thereof," N. Zhang have described the utilization of DRIE and wet etching release process technologies to construct the optical switch devices from SOI wafer, or bonded silicon wafers. Such disclosed optical switches comprise a high-aspect-ratio micro-mirror with vertical sidewall and an electrostatic comb drive actuator for controlling the position of micro-mirror. The common comb drive actuator includes a stationary comb finger electrode, and a movable comb finger electrode connected to the micro-mirror via a suspended spring. Said suspended spring is anchored on to a substrate at one end. Electrostatic force for moving the micromirror can be generated by applying voltage to comb drive actuator. The restoration force generated by the deformed spring will pull the actuated micromirror return to the initial position. Regarding the application of optical switch, micro-mirror can be moved from the initial off-state (light transmission state) to the actuated on-state (light reflection state, i.e., switching) via applying voltage to comb drive actuator.

However, a continuously applied electrical load on MEMS actuator is necessary to hold the micro-mirror of optical switch staying at the on-state, because we need the force generated by MEMS actuator to balance the restoring force from spring. Therefore, mechanically-bistable mechanism, i.e., latch mechanism, which provides two relative positions both are mechanically stable, is desirable for optical switch to maintain at on-state without electrical power consumption. Prior art of U.S. Pat. No. 6,303,885, of "Bi-stable Micro Switch" of B. P. Hichwa, C. Marxer, and M. Gale has disclosed a latched optical switch using buckled-beam with the arch-shaped leaf spring geometry driven by a bi-directional movable electrostatic comb actuator. Additionally, prior art of U.S. Pat. No. 6,549,107, "Latching Mechanism for MEMS Actuator and Method of Fabrication" of M. Lim, R. Fan, and L. Que has disclosed another kind of latch mechanism for optical switch has been realized by using gripper to clamp the switch at one position.

It is also important for optical switches to have low insertion loss, low polarization dependent loss, and low back reflection loss in practical applications. Combining the MEMS elements with micro-optics provides optical switch devices a free-space light path design approach. This is a key way to make the light beam coming from input fiber become collimated beam shape thereby to gain in better optical performances. The larger collimated beam size, for example, from several tens to hundreds of micrometers, will make better optical performance, and make the acceptable alignment tolerance higher during the device assembly process. However, it will also lead to a requirement that the corresponding MEMS actuator has to be able to provide enough displacement so as to make the micro-mirror fully reflect the incoming light beam. In the conventional design of electrostatic comb-drive actuator, the maximum static displacement of comb actuator is limited by the side sticking effect of comb fingers. The tiny deviations of comb finger and gap width will cause the unbalanced force of both sides of finger electrode, and such deviation is easily induced by microfabrication process. The unbalanced force of both sides of finger electrode is the major contribution factor to the side sticking effect.

Obviously, the conventional MEMS based optical switches using the electrostatic comb drive actuator and buckle beam formed on SOI substrates have encountered the following issues: 1) The large displacement provided by comb drive for gaining in better optical performance in conjunction with optics will lead to design limit of comb drive actuators and very high driving voltage for such comb drive actuators. 2) The necessary force output provided by comb drive for moving the arch-shaped leaf spring from one stable state to the other stable state will require the adopted MEMS actuator generate the needed force. According to the functional requirements for practical applications of optical switches mentioned above, the desirable device features of optical switches include large displacement regarding mirror, large force output from actuator, and latch mechanism for device itself. The present invention then provides novel designs to make the optical switch with aforementioned device features. We now disclose novel designs of latched optical switch based on using electrothermal V-beam actuators and movement translation mechanisms.

SUMMARY OF THE INVENTION

In view of the above mentioned optical switch function requirements, the present invention is then objected to provide optical switches using electrothermal V-beam actuators to generate the necessary force output and displacement, and to provide optical switches using structures, links and movement translation mechanism to perform the bi-directional movement and motion, and to provide optical switches using buckle beam spring as the latch mechanism to let reflective mirror shutter maintain at bi-stable positions without electrical power consumption.

The optical switches of the present invention comprise two sets of movable V-beam actuators, a set of buckle beam springs connected to a suspended movable shutter beam with a reflective mirror shutter, and at least a suspended movable translation link at ends of said suspended movable shutter beam. Both ends of this set of buckle beam springs are anchored to the substrate, while center of buckle beam is connected to said suspended movable shutter beam. Force generated by one of the two sets of electrothermal V-beam actuator upon various values of the applied electrical load is against the restoration force from buckle beam springs. The buckle beam is deflected to a range where the force from bended buckle beam spring is balanced to the force generated by actuated V-beam actuator, when the V-beam actuator is under the electrical load. The V-beam actuator can push or pull the suspended movable translation link to move the shutter beam when the buckled beam spring being deflected into opposite direction with deflection equivalent to 133% initial buckle deflection due to the generated electrothermal force against the existing buckle beam spring force. (The value of 133% could be found in the reference of U.S. patent in application No. "2003/0029705A1") Thereafter, the mirror and shutter beam will move from initial position to another position of the bi-stable state. On the other hand, the mirror and shutter beam will be moved by the suspended movable translation link back to the initial position of the bi-stable state, when another one of the two sets of electrothermal V-beam actuator is actuated to pull or push the suspended movable translation link. Thereby the on-off switching operation with latch function is realized by the present invention.

In preferred embodiments, the movement translation mechanism of said optical switch is a mechanism comprising at least one movement translation link connected to said shutter beam, and structure connected to the V-beam actuator along with the arched direction for pushing and pulling the movement translation link. The V-beam actuators can push and pull the shutter beam with reflective mirror shutter via moveable translation link to perform the on-off switching function for optical switch application.

In other embodiments, the two sets of V-beam actuators of said optical switch have their arched directions in parallel toward opposite directions, and each sets of V-beam actuator comprises at least one V-shaped arch beam with two ends anchored onto a substrate. The V-beam electrothermal actuator is elongated and deflected toward the arched direction of V-beam when electrical load is applied cross the two ends of V-beam. Thereby one directional motion and movement is generated by driving one of the two sets of V-beam actuators. In order to make two-way motion and bi-directional movement, two sets of V-beam actuators of said optical switch are arranged in a way that their actuation and moving directions are parallel and opposite. Thus one set of V-beam actuator is responsible for pushing the moveable translation link, and the other set of V-beam actuator is responsible for pulling the moveable translation link. In conjunction with the movement translation link structure, the on-off switching operation is realized by using bi-directional movement generated by said two sets of V-beam actuators.

BRIEF DESCRIPTION OF THE DRAWINGS

FIGS. 1C and D are the top view and side view of said optical switch in switching-on state and the second stable state, i.e., the reflection state in this figure as an example, thus the input optical signals transmit forward to the reflective mirror shutter, then being reflected toward the output channel.

FIGS. 2A and 2B are the top view and side view of said optical switch respectively in initial state and the first stable state (switch-off state), i.e., the transmission state in this figure as an example, thus the input optical signals transmit directly toward the output channel. FIGS. 2C and D are the top view and side view of said optical switch in switching-on state and the second stable state, i.e., the reflection state in this figure as an example, thus the input optical signals transmit forward to the reflective mirror shutter, then being reflected toward the output channel.

FIGS. 3A and 3B are the top view and side view of said optical switch respectively in initial state and the first stable state (switch-off state), i.e., the transmission state in this figure as an example, thus the input optical signals transmit directly toward the output channel. FIGS. 3C and 3D are the top view and side view of said optical switch respectively in switching-on state and the second stable state, i.e., the reflection state in this figure as an example, thus the input optical signals transmit forward to the reflective mirror-shutter, then being reflected toward the output channel.

DETAILED DESCRIPTION OF THE PREFERRED EMBODIMENT

Figure 1A:
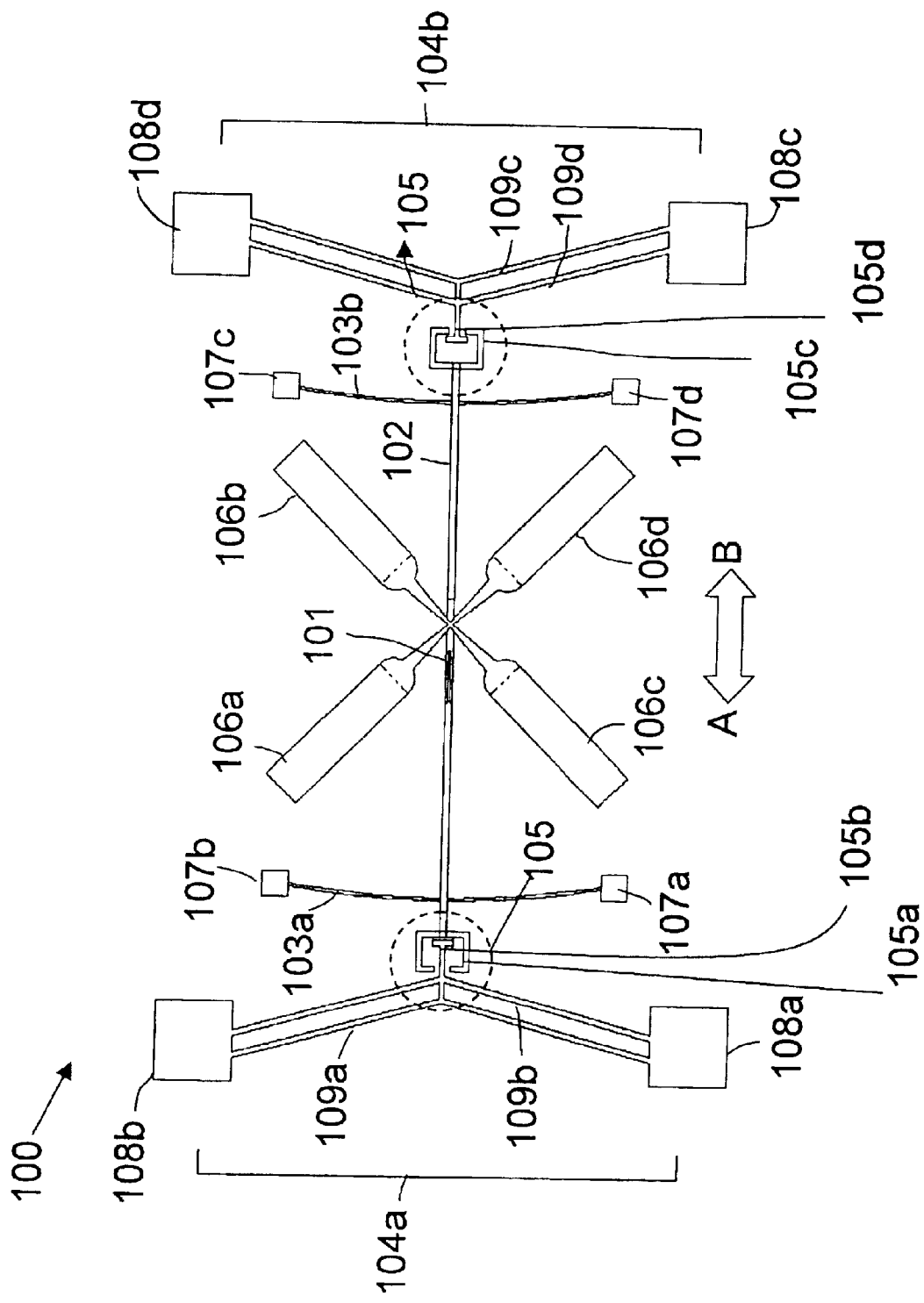
FIGS. 1A to D show the schematic diagrams of the optical switch in crossbar switch configuration comprising a reflective mirror shutter on a shutter beam, a set of suspended buckle beam springs connected to the shutter beam, two sets of V-beam actuators with opposite moving direction connected to said shutter beam via moveable translation links located at two ends of said shutter beam, and four fiber optics channels referring to the input and output channels wherein, FIGS. 1A and B are the top view and side view of said optical switch respectively in initial state and the first stable state (switch-off state), i.e., the transmission state in this figure as an example, thus the input optical signals transmit directly toward the output channel.
Figure 1:
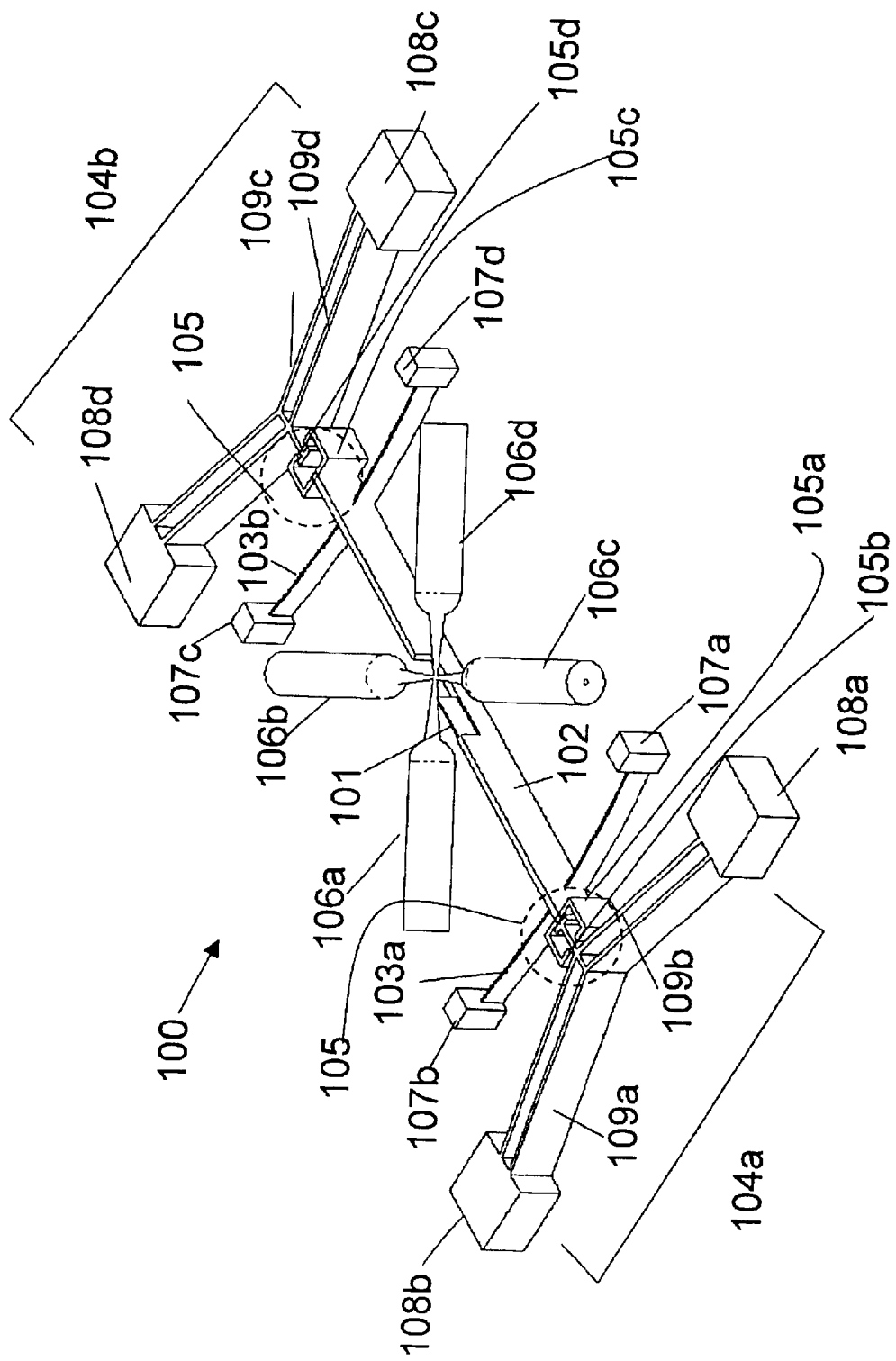
FIGS. 1E and 1F show another example of the optical switch presented in FIGS. 1A to D having a different layout configuration especially for said two sets of V-beam actuators.

A more complete understanding of these and other features and advantages of the present invention will become apparent from a careful consideration of the following detailed description of certain embodiments illustrated in the drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

EXAMPLE 1

FIGS. 1A, 1B, 1C, 1D, 1E, and 1F are respectively the schematic diagram of the optical switch in accordance with an embodiment of the present invention.

As shown in FIGS. 1A and 1B, the optical switch 100 in crossbar switch configuration comprises a reflective mirror shutter 101 on a shutter beam 102, a set of suspended buckle beam springs 103a, 103b connected to the shutter beam 102, two sets of electrothermal V-beam actuators 104a, 104b with opposite moving directions A & B connected to said shutter beam 102 via moveable translation links 105a and 105c located at two ends of said shutter beam 102, and four fiber optics 106a–106d channels referring to the input and output channels. The said optical switch 100 can be constructed from SOI wafer or bonded silicon wafers by using DRIE and subsequent wet etching releasing processes. Both ends of this set of suspended buckle beam springs 103a, 103b are anchored to the substrate via anchors 107a–107d, while the center of buckle beam is connected to said suspended movable shutter beam 102. Furthermore, both ends of a set of V-beam actuators 104a, 104b are anchored to the substrate via anchors 108a–108d, and V-beam actuators 104a, 104b comprise at least one V-shaped beam 109a–109d arranged in a layout that a link beam structure 105b and 105d connects said V-shaped beams 109a–109d via their center and the link beam structure 105b and 105d is along with the direction of moving directions A & B of V-beam actuator 104a, 104b, i.e., the arched-direction of V-shaped beam 109a–109d. Force, movement, and displacement is generated by one of the two sets of electrothermal V-beam actuator 104a, 104b upon various values of the applied electrical load cross two ends of V-shaped beam 109a–109d via said anchors 108a–108d, thus the link beam structure 105b pushes the moveable translation link 105a at one end of said shutter beam 102, thereby said shutter beam 102 with a reflective mirror shutter 101 on it will move from the first stable position to the second stable position when the pushing force generated from V-beam actuator 104a is against the restoration force from the deflected buckle beam springs 103a, 103b and the deflection of said buckle beam springs 103a, 103b is larger than 133% value of initial nature deflection of said buckle beam springs 103a, 103b at the situation without external force load. (The value of 133% could be found in the reference of U.S. patent application No. "2003/0029705A1"). The link beam structure 105b and said movement translation link 105a form a spatial joint 105 relation that the movement generated by V-beam actuator 104a can be translated or converted to the movement and motion regarding shutter beam 102 and the connected reflective mirror shutter 101. Such mechanism regarding the design, structures, layout, and achieved actions are defined as movement translation mechanism. FIGS. 1A and 1B also show an operation state of said optical switch 100 where the input optical signals transmit directly toward the output channel, and in this particular example, at this initial state, the optical switch 100 maintains at its first stable state without external electrical load or electrical power consumption in order to hold the optical switch 100 at this state (switch-off state).

Figure 1C:
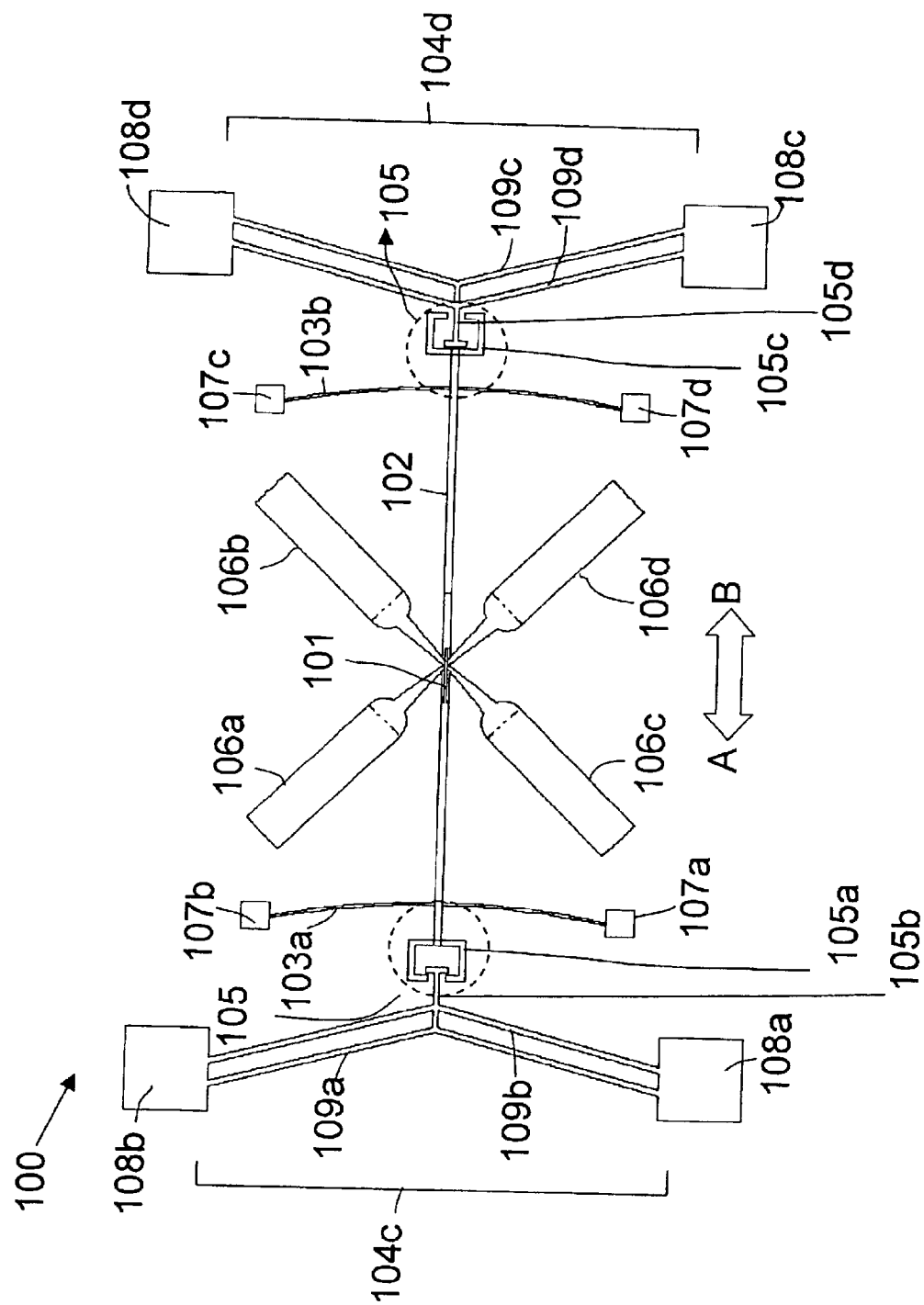
Figure 1D:
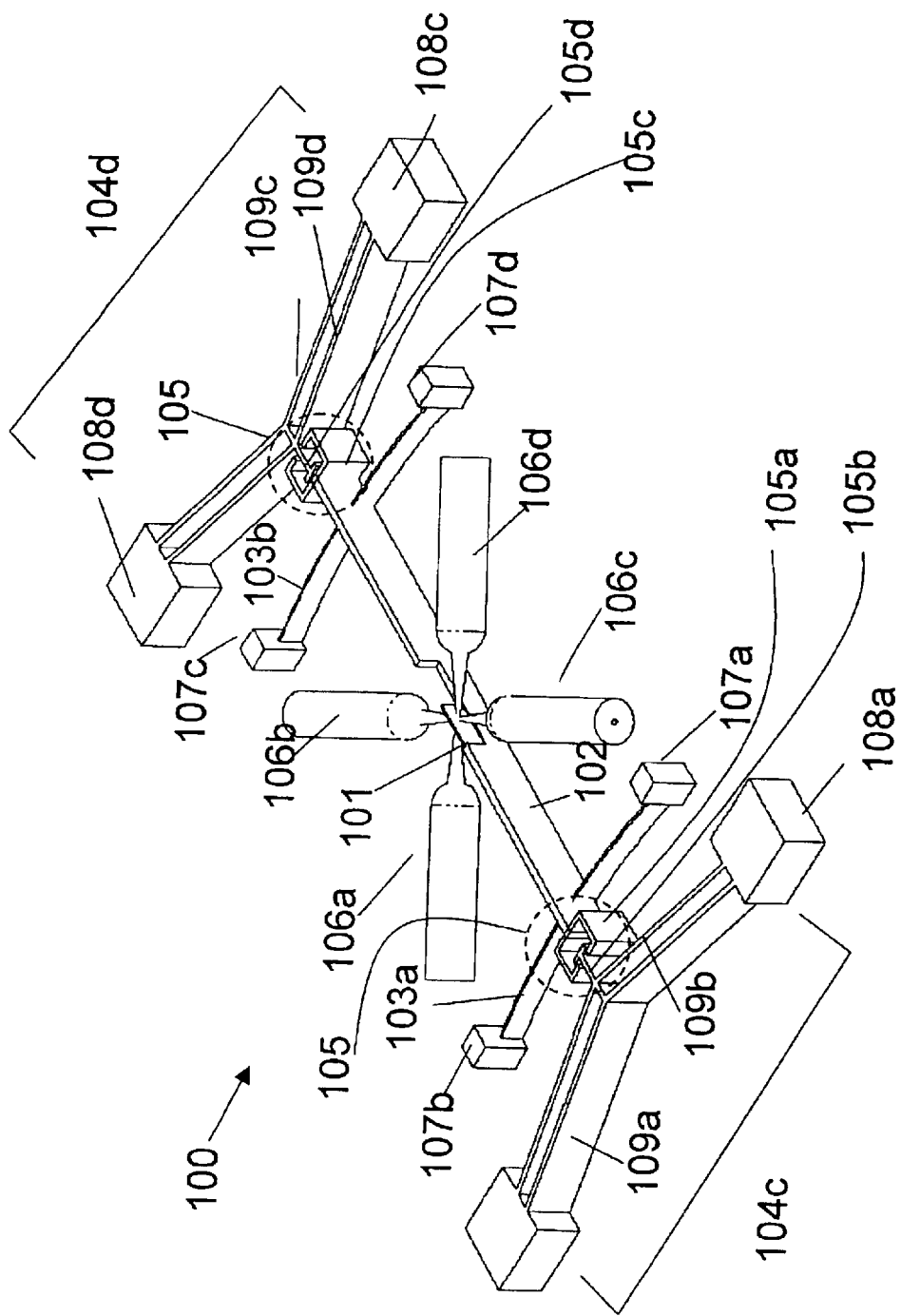
Figure 1:
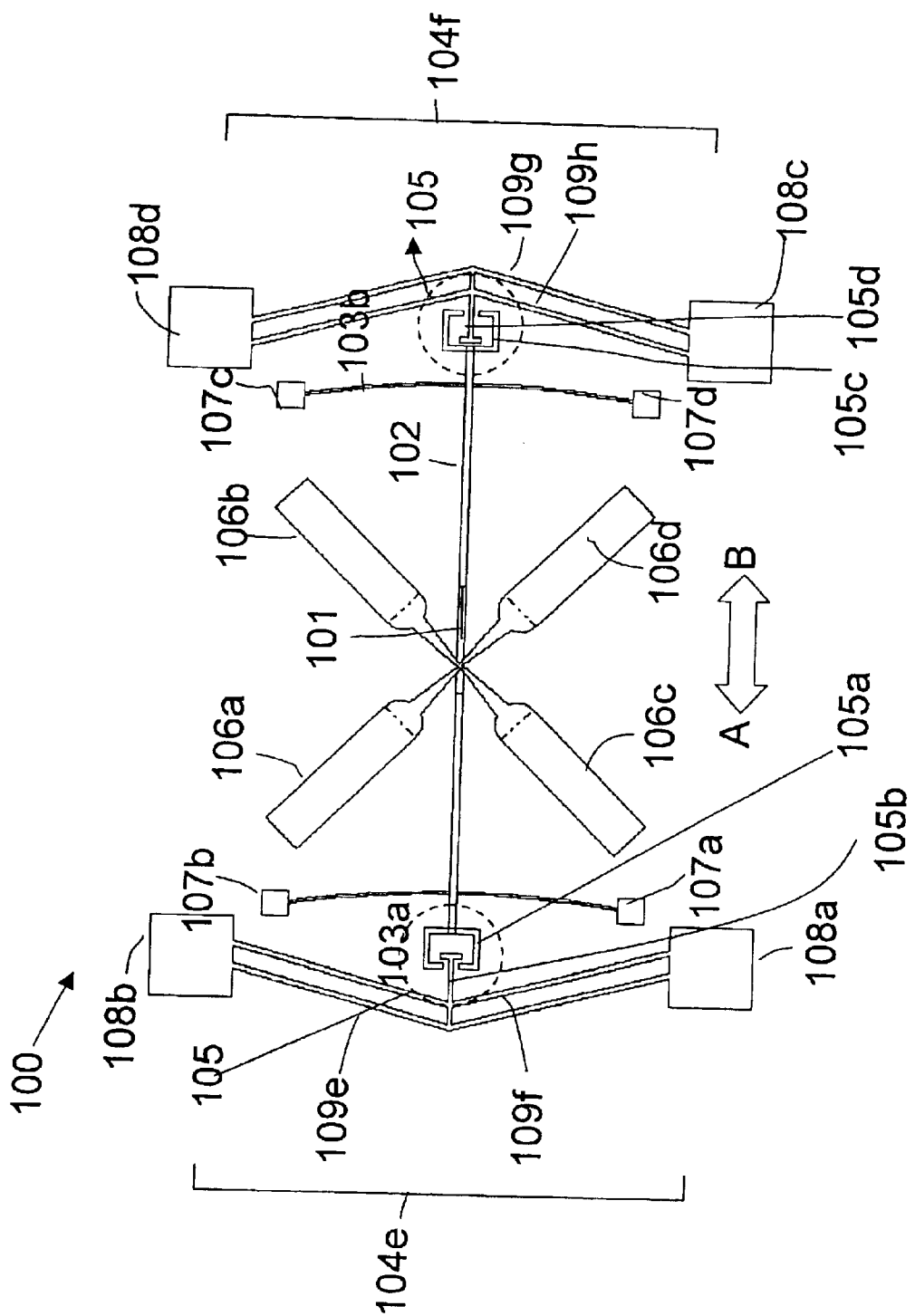

On the other hand, FIGS. 1C and 1D show another operation state of said optical switch 100 where the input optical signals transmit forward reflective mirror shutter 101 and then being reflected toward the output channel of fiber optics 106a–106b. This switch-on operation can be conducted as following procedure: An electrical load is applied cross two ends of V-shaped beam 109c and 109d of another set of electrothermal V-beam actuator 104d via said anchors 108c and 108d, then the generated movement will push the moveable translation link 105d at the other end of said shutter beam 102 by the link beam structure 105c, as a result, the reflective mirror shutter 101 and shutter beam 102 will move from the initial state and also the first stable state (switch-off state), i.e., the transmission state shown in the FIGS. 1A and B, to the second stable state of the optical switch 100 ( Switch-on state). In this particular example, at this switch-on state, the optical switch 100 maintains at its second stable state without external electrical load or electrical power consumption in order to hold the optical switch 100 at this state.

The aforementioned bi-stable operation of said optical switch 100 is realized by using the buckle beam springs 103a and 103b as the latch mechanism. Because the buckle beam springs 103a and 103b exert spring force due to its natural deflection onto the shutter beam 102 to against the force from actuators, environment vibrations, shocks, etc., so the optical switch 100 may perform the latch function with any external electrical load and electrical power consumption. On the other hand, the fiber optics 106a~106b used for handling the input and output optical signals may include the optical fibers, TEC fibers, lens fibers, Grin lens, micro-lens, gratings, reflective optics, diffractive optics, micro-optics, etc.

Figure 1F:
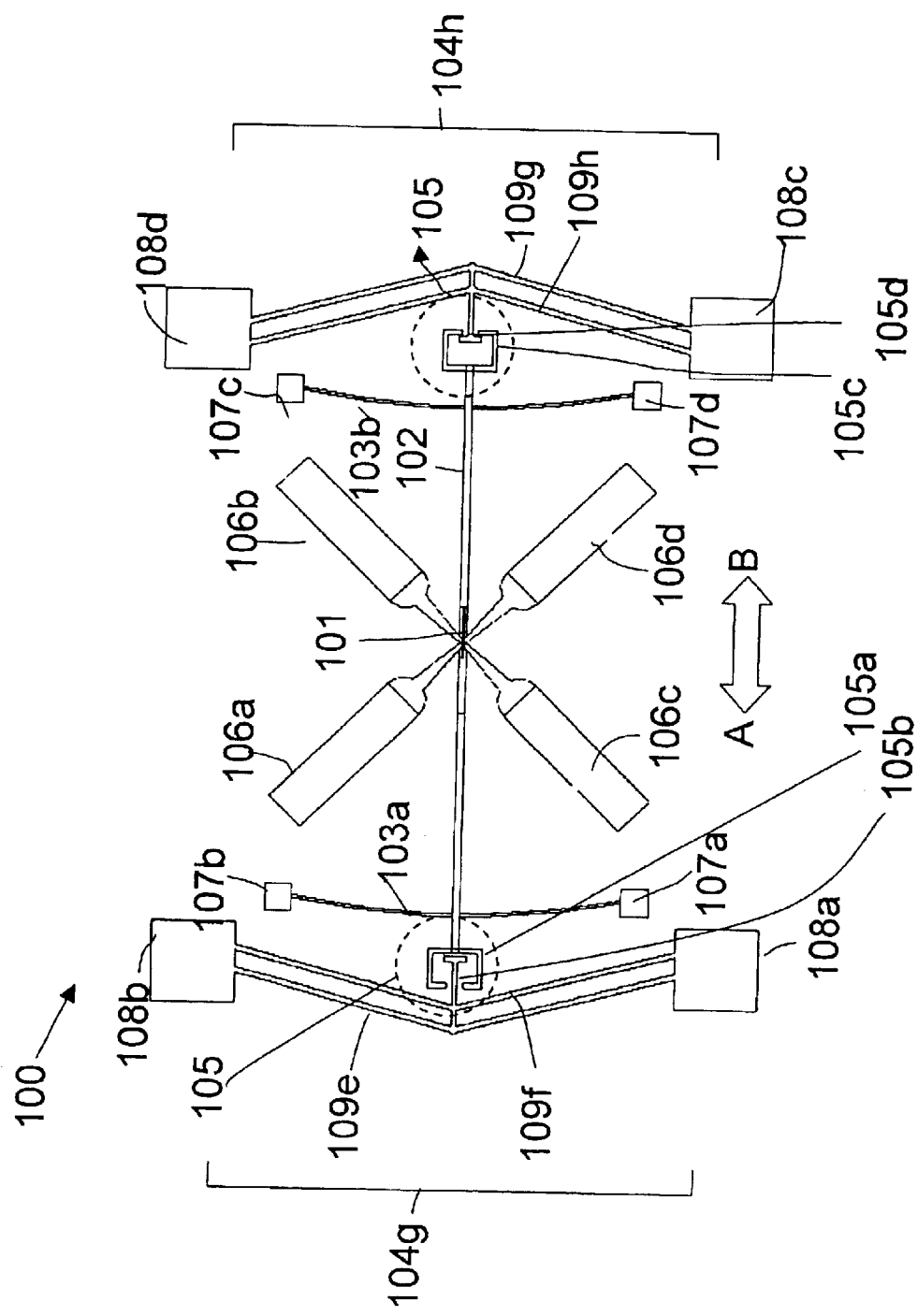
Figure 2:
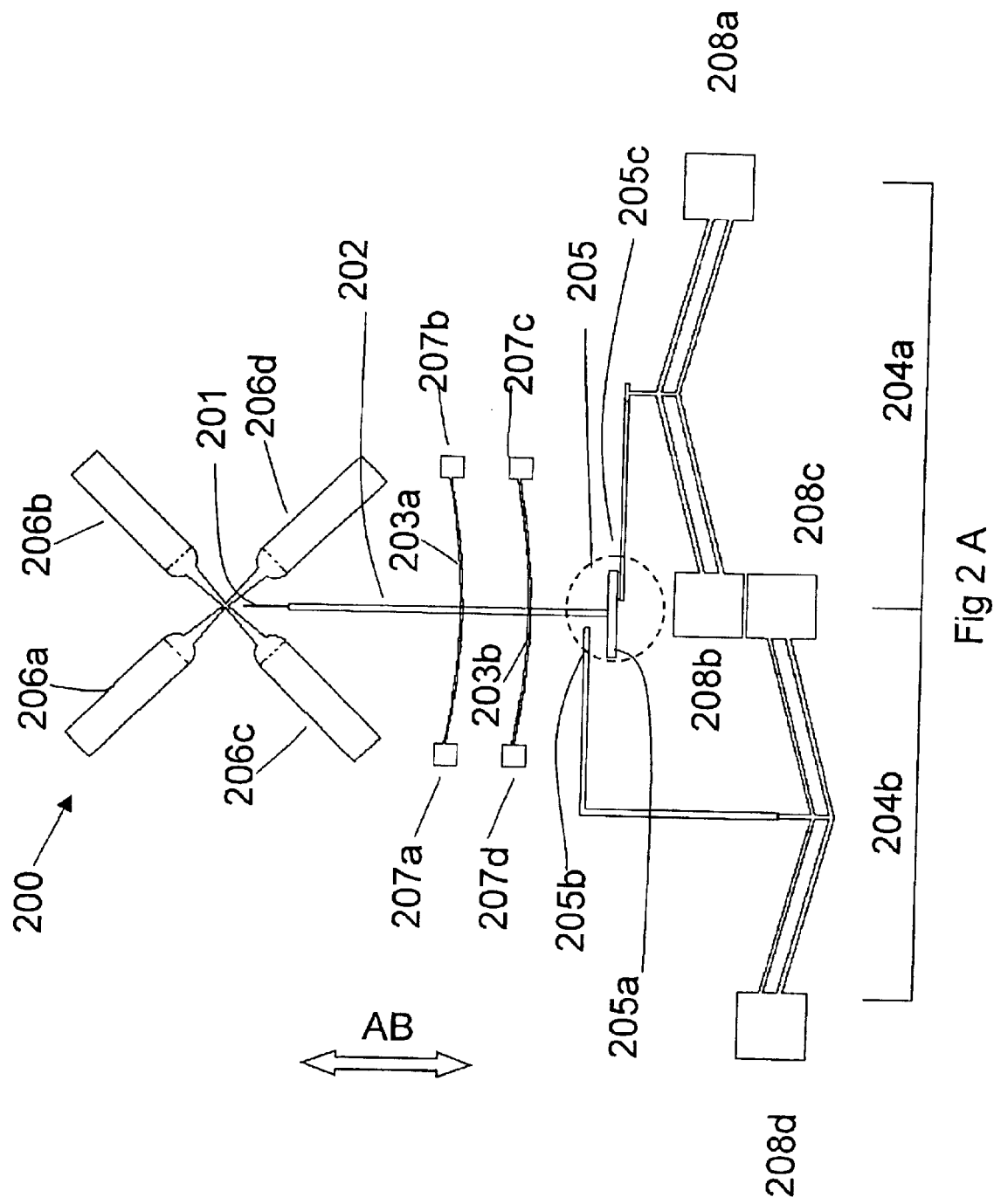
FIGS. 2A to 2D show the schematic diagram of the optical switch in crossbar switch configuration comprising a reflective mirror shutter on a shutter beam, a set of suspended buckle beam springs connected to the shutter beam, two sets of V-beam actuators with opposite moving direction separately located at one end of said shutter beam, one set of V-beam actuator can push the moveable translation link at one end of shutter beam move forward to a switching position, i.e., the second stable position, the other set of V-beam actuator can pull the moveable translation link at one end of shutter beam move backward to the initial position, i.e., the first stable position, and the four fiber optics channels are referring to the input and output channels.
Figure 2:
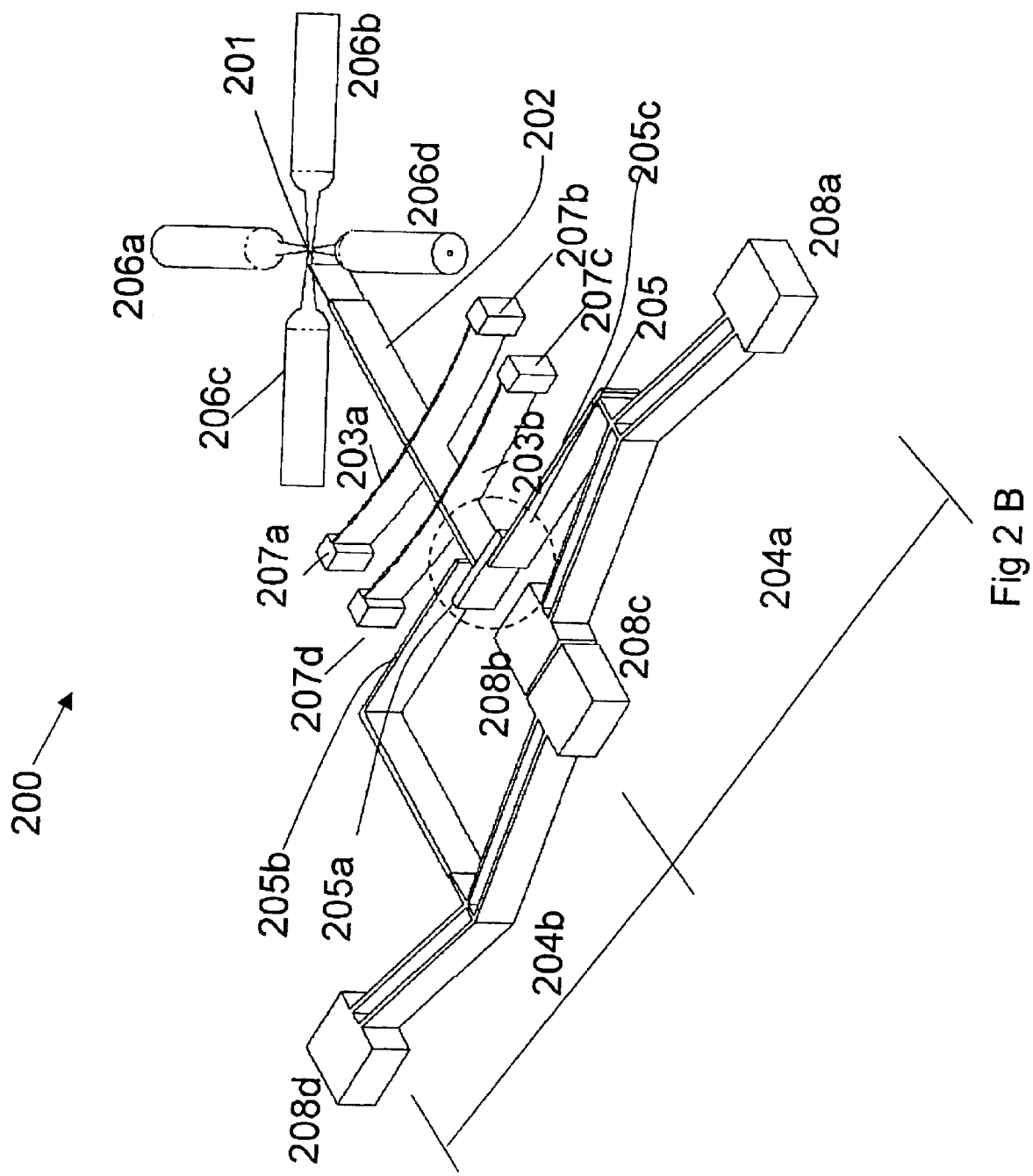
Figure 2:
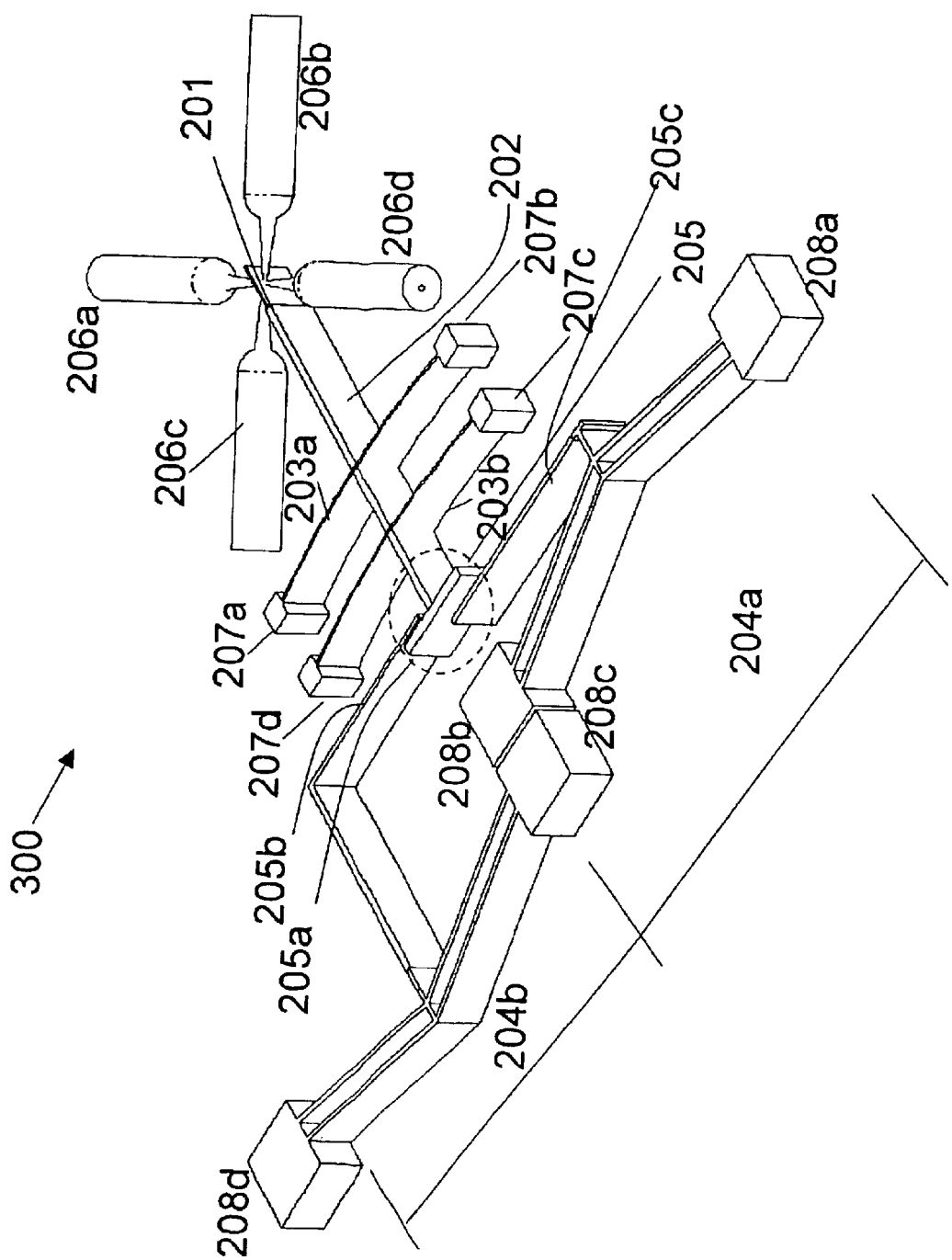

FIGS. 1E and 1F are respectively schematic diagrams of the optical switch with the basic configuration same as the device design discussed in FIGS. 1A to 1D. As shown in FIGS. 1E and 1F, the optical switch 100 in crossbar switch configuration comprising a reflective mirror shutter 101 on a shutter beam 102, a set of suspended buckle beam springs 103a, 103b connected to the shutter beam 102, two sets of electrothermal V-beam actuators 104e,104f with opposite moving directions A & B connected to said shutter beam 102 via movement translation links 105b and 105d located at two ends of said shutter beam 102, and four fiber optics 106a–106d channels referring to the input and output channels. In this particular device layout, V-beam actuators 104e and V-beam actuators 104f are arranged at a layout relation that their arched-directions are toward outside of device regarding shutter beam 102 and aligned in the same line. Thus the forward moving displacement generated by the V-beam actuators 104e, 104f makes pull action to the movement translation link to enable the shutter beam and reflective mirror shutter move from the stable position to another stable position in conjunction with latch function provided by the buckle beam springs 103a and 103b.

EXAMPLE 2

FIGS. 2A, 2B, 2C, and 2D are respectively the schematic diagram of the optical switch in accordance with another embodiment of the present invention.

As shown in FIGS. 2A to 2D, the optical switch 200 in crossbar switch configuration comprises a reflective mirror shutter 201 on one end of a shutter beam 202, a moveable translation link 205a located at the other end of shutter beam 202, a set of suspended buckle beam springs 203a, 203b connected to the shutter beam 202, two sets of electrothermal V-beam actuators 204a, 204b with opposite moving directions A & B connected to two link beams 205b, 205c, respectively, to transfer the movement to said moveable translation link 205a, and four fiber optics 206a–206d channels referring to the input and output channels. Both ends of the buckle beam springs 203a, 203b are anchored to the substrate via anchors 207a–207d, while the center of buckle beam is connected to said suspended movable shutter beam 202. Both ends of the V-beam actuators 204a,204b are anchored on the substrate via anchors 208a–208d. The V-beam actuators 204a,204b of said optical switch comprise two sets of V-beam actuators separately located at one end of shutter beam. The two link beams separately connected to two sets of V-beam actuators 204a,204b combine with the movement translation link 205a connected to the shutter beam 202 to form the spatial joint 205. By using the moveable translation mechanism in terms of spatial joint 205, the forward moving displacement generated by one set of the two sets of V-beam actuators 204a makes push action to enable the shutter beam and the reflective mirror shutter move from one stable position (according to the FIGS. 2A and B, the optical switch is operated in transmission state at this initial state) to another stable position, i.e., the second stable state, (according to the FIGS. 2C and 2D, the optical switch is operated in reflection state at this second stable state), while V-beam actuators 204b generates pull action to enable the shutter beam and the reflective mirror shutter move from the second stable position (according to the FIGS. 2C and 2D, the optical switch is operated in reflection state at this second stable state) to the initial stable position (according to FIGS. 2A and 2B, the optical switch is operated in transmission state at this initial state). Therefore bi-stable switching function of optical switch is realized by our proposed moveable translation mechanism in conjunction with latch function provided by the buckle beam springs 203a and 203b.

EXAMPLE 3

FIGS. 3A, 3B, 3C, 3D, 3E, and 3F are respectively schematic diagrams of the optical switch in accordance with another embodiment of the present invention.

As shown in FIGS. 3A to 3D, the optical switch 300 in crossbar switch configuration comprises a reflective mirror shutter 301 on one end of a shutter beam 302, a moveable translation link 305a located at the other end of the shutter beam 302, a set of suspended buckle beam springs 303a, 303b connected to the shutter beam 302, two sets of electrothermal V-beam actuators 304a, 304b with opposite moving directions A & B connected to each other via a link beam 305 and located at one side of the shutter beam 302, and four fiber optics 306a–306d channels referring to the input and output channels. Both ends of the buckle beam springs 303a, 303b are anchored to the substrate via anchors 307a–307d, while the center of buckle beam is connected to said suspended movable shutter beam 302. Both ends of the V-beam actuators 304a, 304b are anchored on the substrate via anchors 308a–308d. The V-beam actuators 304a, 304b of said optical switch comprise two sets of V-beam actuator, where each V-beam actuator 309a–309d set has opposite arched-direction and their arched-direction are toward the outside direction of each other and shutter beam 302. The link beam 305a connected to two said sets of V-beam actuators 304a, 304b in conjunction with movement translation link 305a connected to the shutter beam 302 to form the spatial joint 305.

Figure 3:
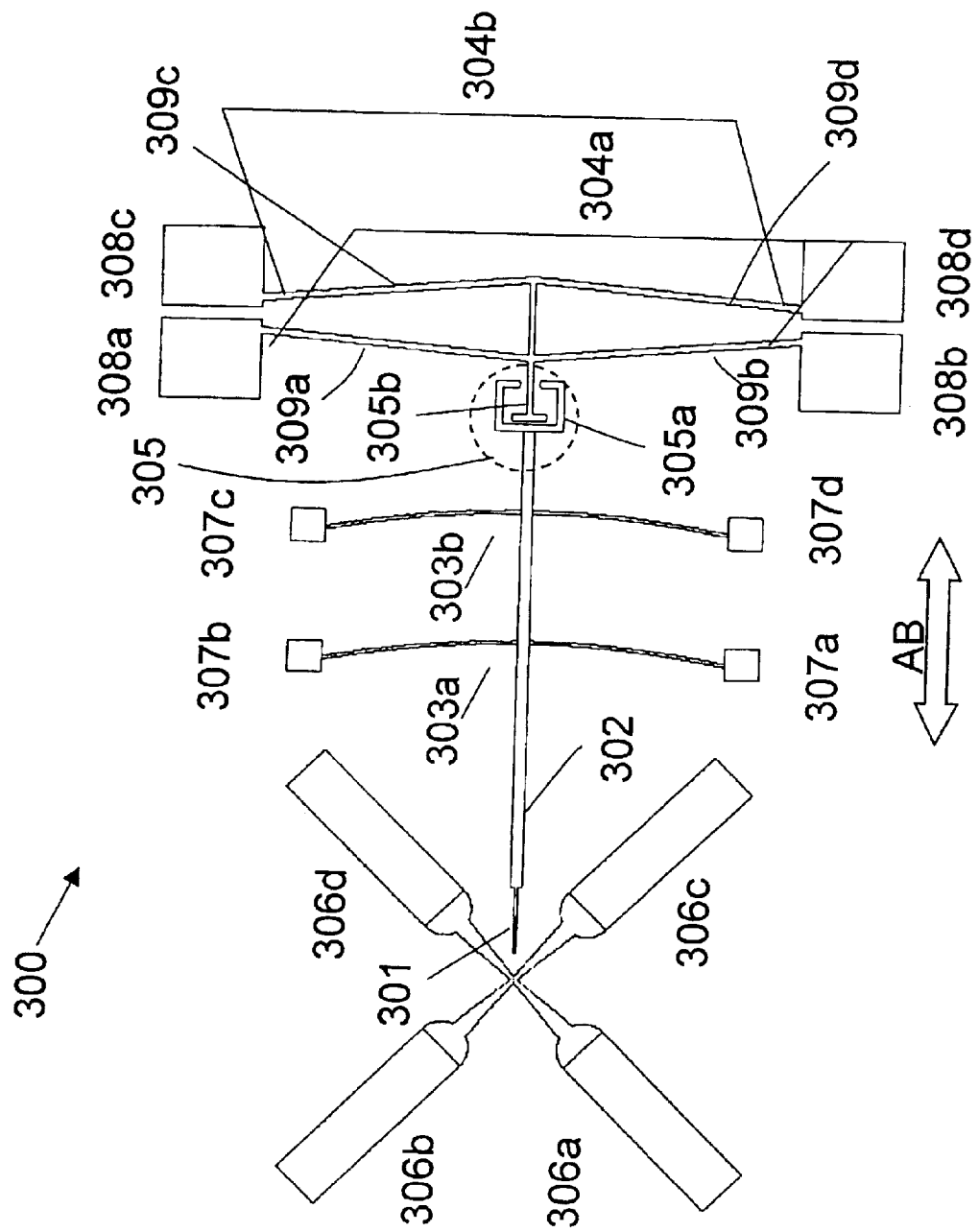
FIGS. 3A to 3D show the schematic diagrams of the optical switch in crossbar switch configuration comprising a reflective mirror shutter on a shutter beam, a set of suspended buckle beam springs connected to the shutter beam, a pair of sets of V-beam actuators with opposite moving direction connected to each other via a link beam and located at one end of said shutter beam, one set of V-beam actuator among said pair of sets of V-beam actuators can push the moveable translation link at one end of shutter beam move forward to a switching position, i.e., the second stable position, the other set of V-beam actuator can pull the moveable translation link at one end of shutter beam move backward to the initial position, i.e., the first stable position, and four fiber optics channels are referring to the input and output channels.
FIGS. 3E and 3F show another example of the optical switch presented in FIGS. 3A to 3D having a different layout configuration especially for said pair of sets of V-beam actuators.
Figure 3:
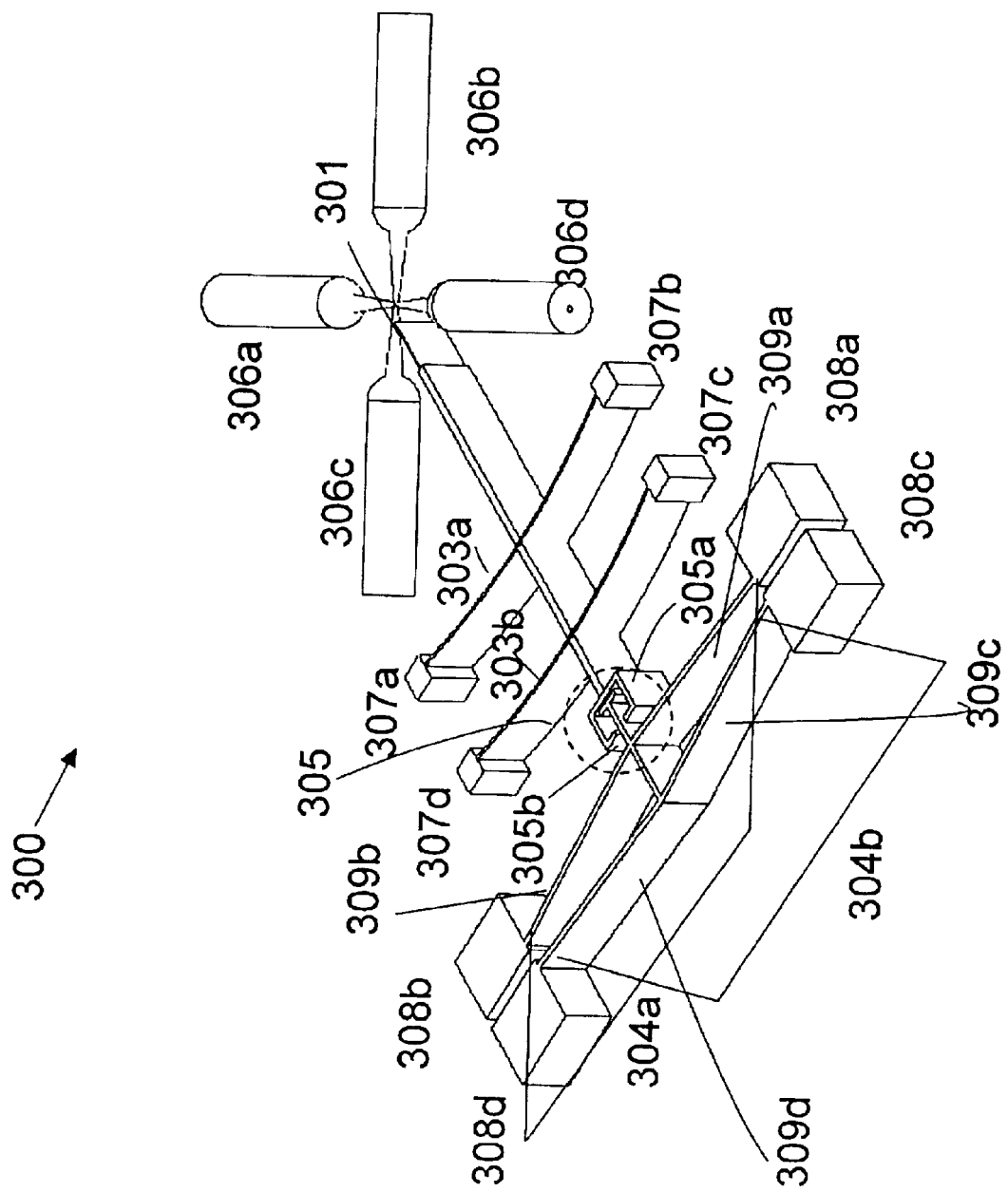
Figure 3:
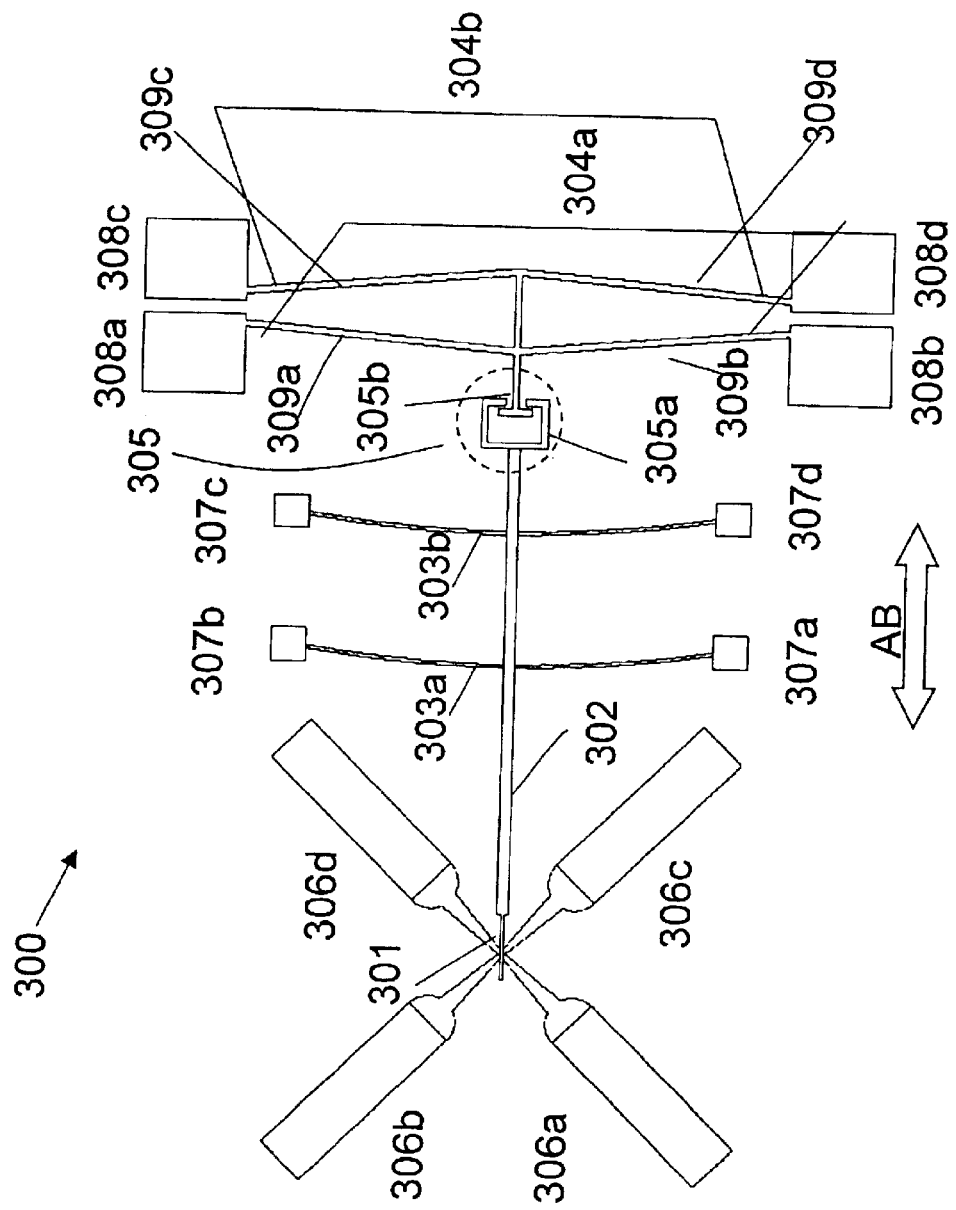
Figure 3:
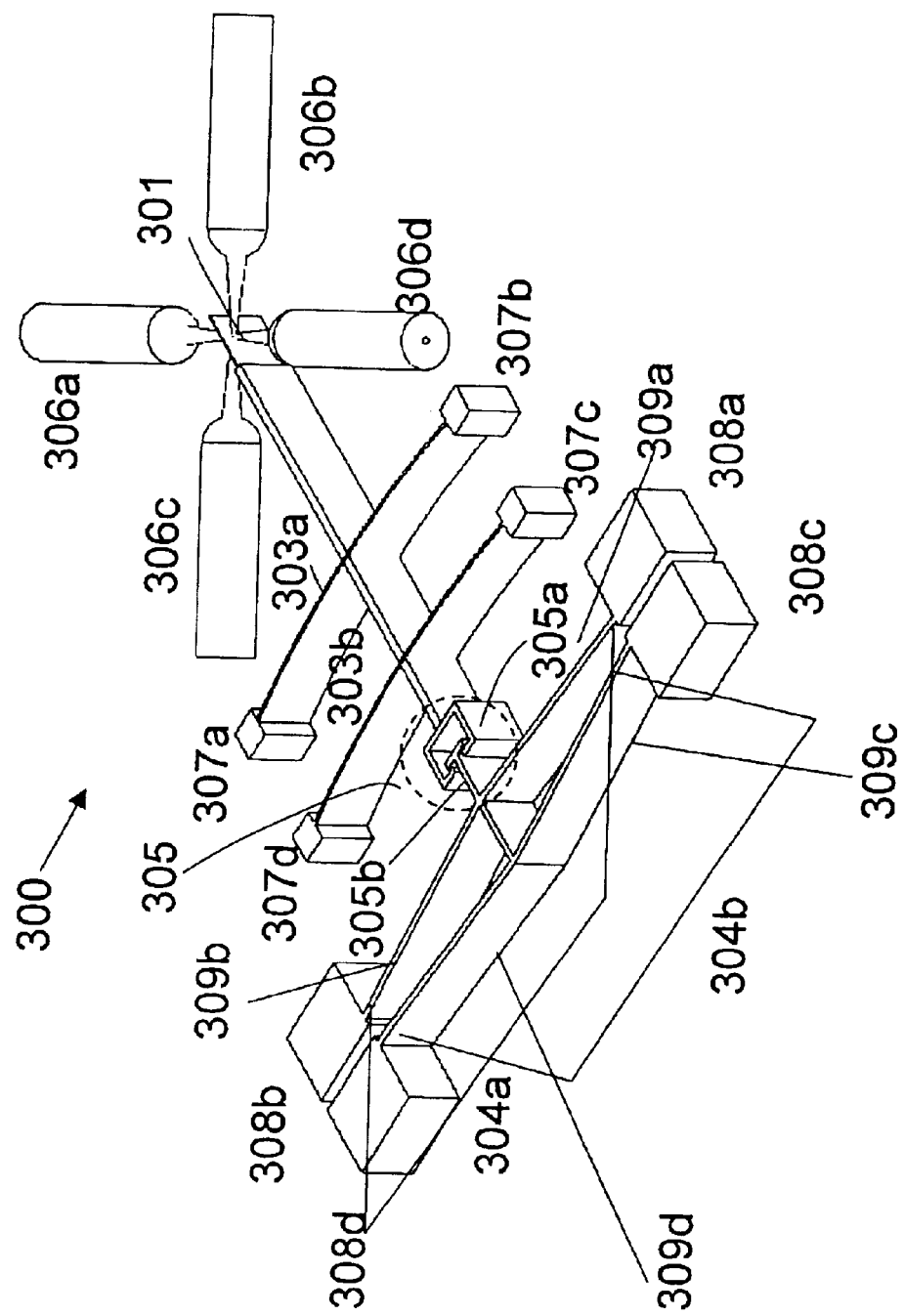
Figure 3:
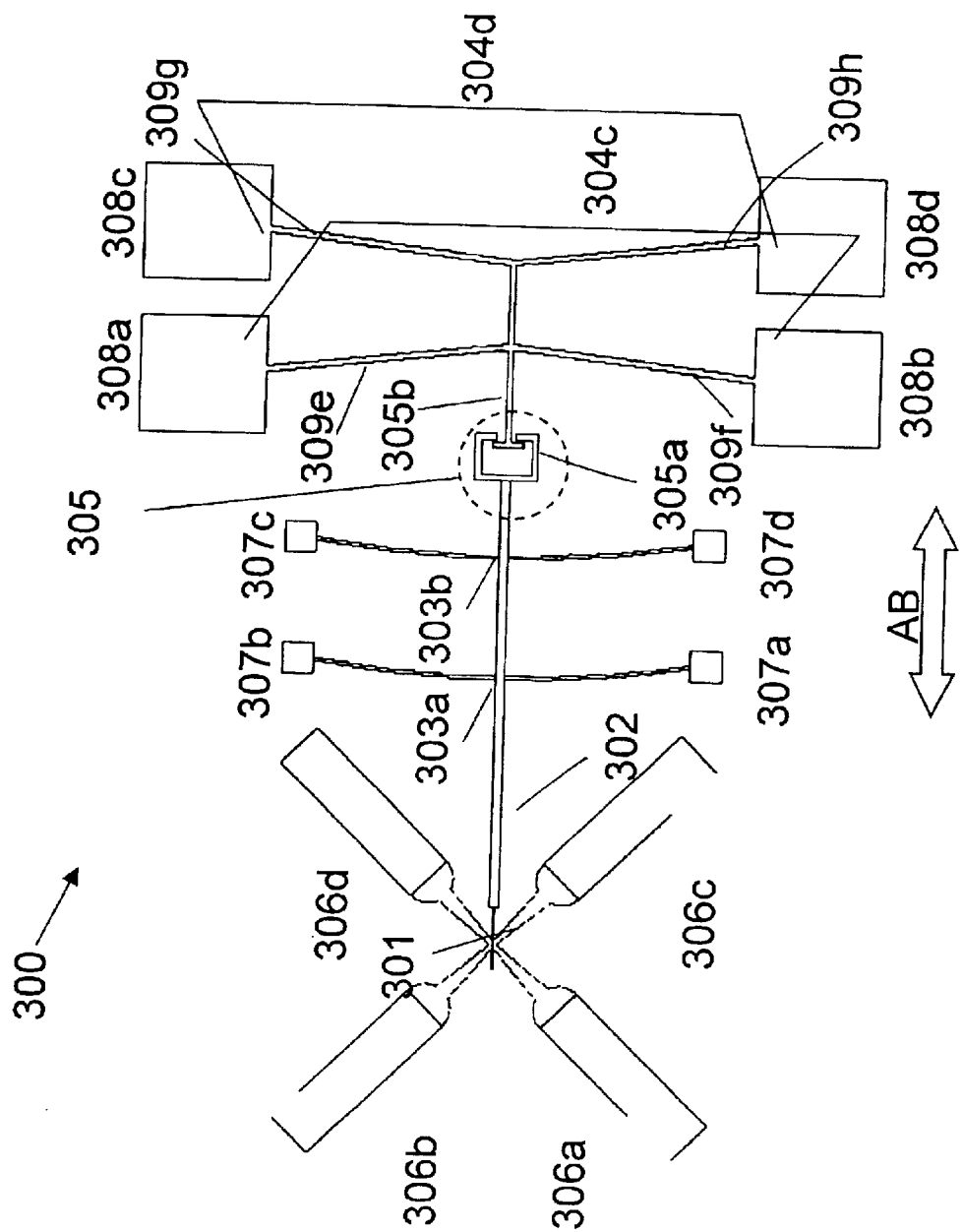
Figure 3:
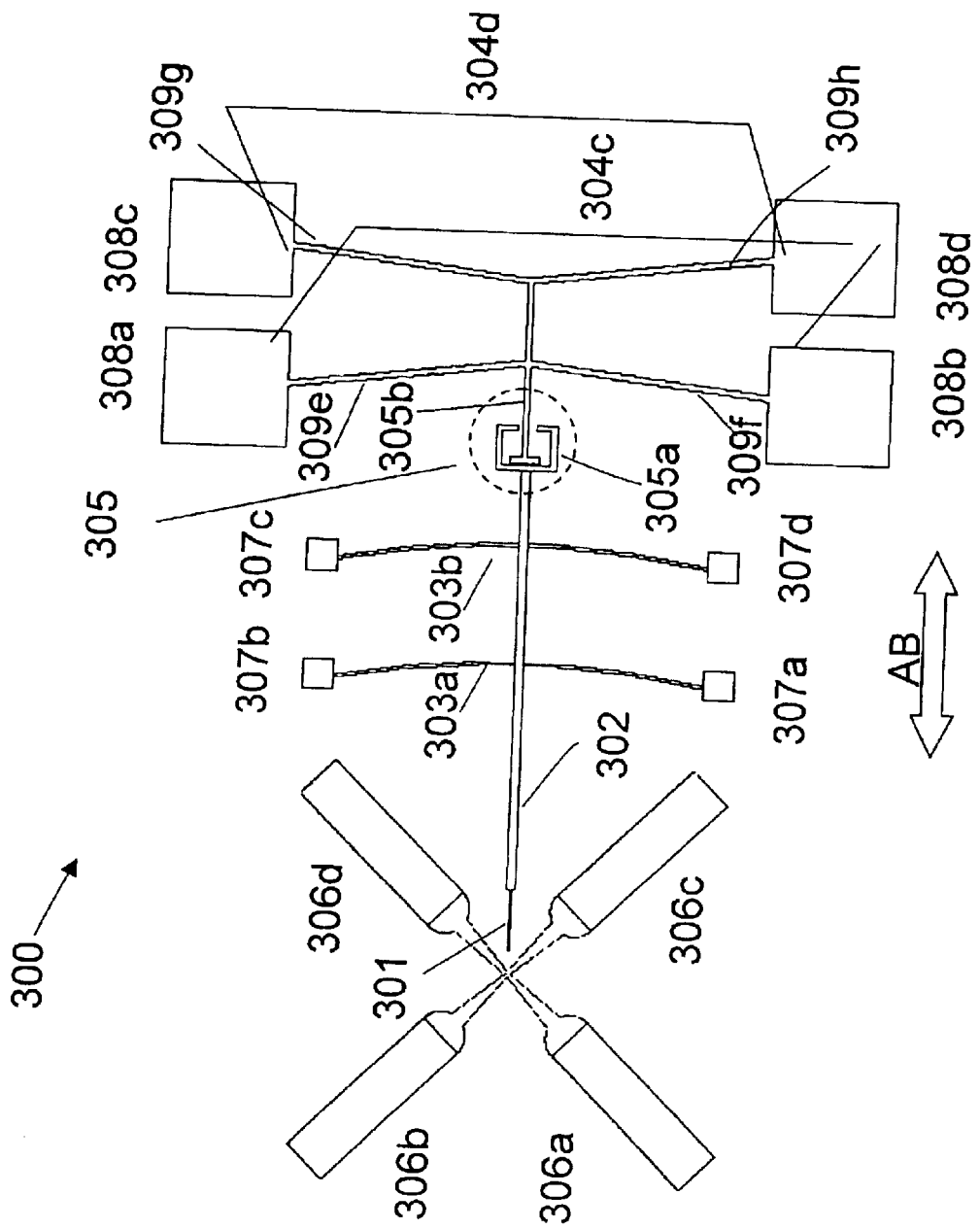

Based on movement translation mechanism, when an electrical load is applied to one set of V-beam actuators 304a a displacement and movement generated by V-beam actuators 304a is transferred to act on the shutter beam with buckle beam springs to move via the spatial joint 305. The V-beam actuator 304a near by the spatial joint 305 can push the shutter beam from the initial stable position to the second stable position, while the other V-beam actuator 304b away from the spatial joint 305 can pull the shutter beam from the second stable position to the initial stable position. On the other hand, we may also modify the design to let the V-beam actuator 304b away from the spatial joint 305 pull the shutter beam from the initial stable position to the second stable position, and to let other V-beam actuator 309a–309b near by the spatial joint 305 push the shutter beam from the second stable position to the initial stable position. FIGS. 3A and 3B also show an operation state of said optical switch 300 where the input optical signals transmit directly toward the output channel, and in this particular example, at this initial state, the optical switch 300 maintains at its first stable state without external electrical load or electrical power consumption in order to hold the optical switch 300 at this state (switch-off state). On the other hand, FIGS. 3C and D shows the other operation state of said optical switch 300 where the input optical signals transmit forward to reflective mirror shutter 301 and then being reflected toward the output channel of fiber optics 306a–306b. This switch-on operation can be conducted as following procedure: An electrical load is applied cross two ends of V-shaped beam 309a and 309b of the other set of electrothermal V-beam actuator 304a via the said anchors 308a and 308b, then the generated movement will push the moveable translation link 305a by the link beam structure 305b via spatial joint 305, as a result, the reflective mirror shutter 301 and shutter beam 302 will move from the initial state and also the first stable state (switch-off state), i.e., the transmission state as shown in the FIGS. 3A and 3B, to the second stable state of the optical switch 300 (Switch-on state). In this particular example, at this switch-on state, the optical switch 300 maintains at its second stable state without external electrical load or electrical power consumption in order to hold the optical switch 300 at this state.

FIGS. 3E and F are respectively schematic diagrams of the optical switch with the basic configuration is the same as the device design discussed in FIGS. 3A to 3D. As shown in FIGS. 3E and 3F, in this particular device layout, the V-beam actuators 304c, 304d of said optical switch comprise two sets of V-beam actuator, where each V-beam actuator 309c–309f set has opposite arched-directions and their arched-directions are toward each other and toward shutter beam 302. Thus the forward moving displacement would be generated by the V-beam actuators 304c, 304d. The V-beam actuator 304c near by the spatial joint 305 can pull the shutter beam from the initial stable position to the second stable position, while the other V-beam actuator 304d away from the spatial joint 305 can push the shutter beam from the second stable position to the initial stable position. On the other hand, the design also can be modified to let the V-beam actuator 304d away from the spatial joint 305 push the shutter beam from the initial stable position to the second stable position, and let other V-beam actuator 304c near by the spatial joint 305 pull the shutter beam from the second stable position to the initial stable position.

Therefore the bi-stable switching function of optical switch then is realized by the proposed moveable translation mechanism in conjunction with latch function provided by the buckle beam springs 303*a* and 303*b*.

Although the present invention has been described with a certain degree of particularity, the present disclosure has been made by way of example and changes in details in details of structure may be made without departing from the spirit thereof.

What is claimed is:

1. An optical switch comprising: a reflective mirror shutter connected to a shutter beam and buckle beam springs; a set of suspended buckle beam springs connected to said movable shutter beam and with two ends anchored onto a substrate, and, a shutter beam connected to at least one moveable translation link and which is movable with respect to the stationary portion of said substrate in response to the operation of V-beam actuators, thereby said reflective mirror shutter is moved by this shutter beam; characterized in that, said V-beam actuators consist at least two sets of movable V-beams suspended on the substrate with two ends anchored onto said substrate, and connected to a link beam structure for pushing and pulling the movement translation link, thereby said shutter beam is moved by said V-beam actuators; said optical switch also comprises fiber optics for handling the input and output optical signals.

2. The optical switch as claimed in claim 1, wherein a moveable translation mechanism of the optical switch comprises at least one moveable translation link structure connected to the end of said shutter beam, and movement of this said moveable translation link structure link with displacement of V-beam actuator via spatial joint; thereby said V-beam actuators push and pull the shutter beam with buckle beam springs to move from one stable position to the other stable position in terms of moveable translation mechanism, and bi-stable switching function of optical switch is achieved.

3. The optical switch as claimed in claim 1, wherein said V-beam actuators of said optical switch comprises at least two sets of V-beam actuators with opposite moving direction arranged with layout configuration that their arched-directions of said two sets of V-beam actuators are parallel along with a line in an opposite way, and both ends of said V-beam actuators are anchored to the substrate, while V-beams are centered with a link beam structure; and the forward moving displacement generated by the V-beam actuator produces push action and pull action to the moveable translation link depending on the spatial layout configuration.

4. An optical switch comprising: a reflective mirror shutter connected to a shutter beam and buckle beam springs; two sets of suspended buckle beam springs connected to said movable shutter beam on both sides of the shutter beam and with two ends anchored onto a substrate; wherein the reflective mirror shutter is arranged on the shutter beam located between the two sets of connection points of said suspended buckle beam springs to shutter beam; a shutter beam connected to two moveable translation links at its ends and is movable with respect to the stationary portion of said substrate in response to the operation of V-beam actuators, thereby said reflective mirror shutter is moved by this said shutter beam; characterized in that, two sets of movable V-beams are suspended on the substrate with two ends anchored onto said substrate and located at both sides of shutter beam, and each sets of V-beam connected to a link beam structure for pushing the movement translation link toward the direction along with the arched-direction regarding the relative V-beam, thereby said shutter beam is moved by said V-bean actuators; said optical switch also comprises fiber optics for handling input and output optical signal.

5. The optical switch as claimed in claim 4, wherein the moveable translation mechanism of said optical switch comprises two moveable translation link structures connected at both ends of said shutter beam, and movement of this said moveable translation link structure link with displacement provided by one of the V-beam actuator set located at both sides via spatial joint at both sides; thereby said V-beam actuators push the shutter beam with buckle beam springs to move from one stable position to another stable position in terms of moveable translation mechanism, and then the bi-stable switching function of optical switch is achieved; and said V-beam actuators of said optical switch comprise two sets of V-beam actuators located at both sides of shutter beam, and each V-beam actuator connected to the shutter beam in terms of spatial joint which comprises link beam connected to V-beam actuator and moveable translation link connected to shutter beam; the two sets of V-beam actuators with opposite moving direction arranged with layout configuration that their arched-directions of said two sets of V-beam actuators are parallel along with a line in an opposite way, and their arched-directions are toward the shutter beam and reflective mirror shutter; and the forward moving displacement generated by the V-beam actuator makes the push action to the moveable translation link to enable the shutter beam and reflective mirror shutter move from the initial stable position to the second stable position.

6. The optical switch as claimed in claim 4, wherein a moveable translation mechanism of said optical switch comprises two moveable translation link structures connected at both ends of said shutter beam, and the movement of said moveable translation link structure link with displacement is provided by one of said V-beam actuators located at both sides via spatial joint at both sides; thereby said V-beam actuators pull the shutter beam with buckle beam springs to move from one stable position to the other stable position in terms of movement translation mechanism, and the bi-stable switching function of optical switch is then achieved; and the V-beam actuators of said optical switch comprises two sets of V-beam actuators located at both sides of shutter beam, and each V-beam actuator connected to the shutter beam in terms of spatial joint which comprises link beam connected to V-beam actuator and movement translation link connected to shutter beam; said two sets of V-beam actuators with opposite moving direction arranged with layout configuration that their arched-directions of said two sets of V-beam actuators are parallel along with a line in an opposite way, and their arched-directions are outward the shutter beam and reflective mirror shutter; and the forward moving displacement generated by the V-beam actuator makes pull action to the moveable translation link to enable the shutter beam and reflective mirror shutter move from the initial stable position to the second stable position.

7. The optical switch as claimed in claim 4, wherein the operation state of the optical switch regarding input optical signals is transmitted forward to output channels at the initial state and switch-off state for the optical switch, and the input optical signals is reflected by said reflective mirror shutter toward output channels at the second stable state and switch-on state for the optical switch.

8. The optical switch as claimed in claim 4, wherein the operation state of the optical switch regarding input optical signals is reflected by said reflective mirror shutter toward output channels at the initial state and switch-off state for said optical switch, and the input optical signals is transmitted forward to output channels at the second stable state and switch-on state for the optical switch.

9. An optical switch comprising: a reflective mirror shutter connected to a shutter beam and buckle beam springs; two sets of suspended buckle beam springs connected to said movable shutter beam and with two ends anchored onto a substrate, where the reflective mirror shutter is arranged on one end of the shutter beam; and a shutter beam connected to a moveable translation link at its end and which is movable with respect to the stationary portion of said substrate in response to the operation of V-beam actuators, thereby said reflective mirror shutter is moved by this shutter beam; characterized in that, two sets of movable V-beams are suspended on the substrate with two ends anchored onto said substrate and located at both sides of shutter beam, and each sets of V-beam is connected to a link beam structure for pushing and pulling the movement translation link move along with the arched-direction regarding the relative V-beam sets, thereby said shutter beam is moved by said V-beam actuators; said optical switch also comprises fiber optics for handling the input and output optical signals.

10. The optical switch as claimed in claim 9, wherein a moveable translation mechanism of the optical switch comprises a moveable translation link structure at one end of said shutter beam, and the movement is provided by one set of the two V-beam actuator sets via link beam; while the separate moveable translation link and two link beams of two sets of V-beam actuators form a spatial joint; thereby one set of V-beam actuators push the shutter beam with buckle beam springs to move from one initial stable position to the second stable position in terms of moveable translation mechanism; furthermore, the other set of V-beam actuators pull the shutter beam with buckle beam springs to move from the second stable position back to the initial stable position in terms of moveable translation mechanism, then the bi-stable switching function of optical switch is achieved; in addition, the V-beam actuators of the optical switch comprise two sets of V-beam actuators separately located at one side of shutter beam, and each V-beam actuator set is connected to a link beam, while the forward moving displacement generated by one set of the two sets of V-beam actuators produces push and pull action to the moveable translation link via said link beam to enable the shutter beam and reflective mirror shutter move from one stable position to another stable position.

11. The optical switch as claimed in claim 9, wherein the operation state of the optical switch regarding input optical signals is transmitted forward to output channels at the initial state and switch-off state for the optical switch, and the input optical signals is reflected by said reflective mirror shutter toward output channels at the second stable state and switch-on state for the optical switch.

12. The optical switch as claimed in claim 9, wherein the operation state of the optical switch regarding input optical signals is reflected by said reflective mirror shutter toward output channels at the initial state and switch-off state for said optical switch, and the input optical signals is transmitted forward to output channels at the second stable state and switch-on state for the optical switch.

13. An optical switch comprising: a reflective mirror shutter connected to a shutter beam and buckle beam springs; two sets of suspended buckle beam springs connected to said movable shutter beam and with two ends anchored onto a substrate; wherein the reflective mirror shutter is arranged on one end of the shutter beam; a shutter beam collected to a moveable translation link at its end and is movable with respect to the stationary portion of said substrate in response to the operation of V-beam actuators, thereby said reflective mirror shutter is moved by this said shutter beam; characterized in that, two sets of movable V-beams are suspended on the substrate with two ends anchored onto said substrate and located at one side of shutter beam, and each sets of V-beam connected to each other via a link beam structure for pushing and pulling the moveable translation link moving along with the arched-direction regarding the relative V-beam sets, thereby said shutter beam is moved by said V-beam actuators; said optical switch also comprises fiber optics for handling the input and output optical signal.

14. The optical switch as claimed in claim 13, wherein a moveable translation mechanism of said optical switch comprises a moveable translation link structure at one end of said shutter beam, and the movement is provided by one set of said two V-beam actuator sets via link beam; said moveable translation link and a link beam form a spatial joint, thereby one set of V-beam actuators push the shutter beam with buckle beam springs to move from one initial stable position to the second stable position in terms of moveable translation mechanism; furthermore, the other set of V-beam actuators pull the shutter beam with buckle beam springs to move from the second stable position back to the initial stable position in terms of moveable translation mechanism, then the bi-stable switching function of optical switch is achieved; in addition, the V-beam actuators of the optical switch comprises two sets of V-beam actuators is connected to each other via a link beam and is located at one side of the shutter beam, and each V-beam actuator set has opposite arched-direction wherein the forward moving displacement generated by one set of the two sets of V-beam actuators produces push and pull actions to the moveable translation link via said link beam to enable the shutter beam and reflective mirror shutter move from one stable position to the another stable position.

15. The optical switch as claimed in claim 13, wherein a moveable translation mechanism of said optical switch comprises a moveable translation link structure at one end of said shutter beam, and the movement is provided by one set of the two V-beam actuator sets via link beam; said moveable translation link and a link beam form a spatial joint; thereby one set of V-beam actuators pull the shutter beam with buckle beam springs to move from one initial stable position to a second stable position in terms of moveable translation mechanism; furthermore, the other set of V-beam actuators push the shutter beam with buckle beam springs to move from the second stable position back to the initial stable position in terms of moveable translation mechanism, then the bi-stable switching function of optical switch is achieved; in addition, the V-beam actuators of the optical switch comprising two sets of V-beam actuators is connected to each other via a link beam and is located at one side of the shutter beam, and each V-beam actuator set has opposite arched-direction; while the forward moving displacement generated by one set of the two sets of V-beam actuators produces push and pull actions to the moveable translation link via said link beam to enable the shutter beam and reflective mirror shutter to move from one stable position to another stable position.

16. The optical switch as claimed in claim 13, wherein the V-beam actuators of the optical switch comprising two sets of V-beam actuators is connected to each other via a link beam and is located at one side of said shutter beam, and each V-beam actuator set has opposite arched-direction and their arched-direction are toward outside the direction of each other.

17. The optical switch as claimed in claim 13, wherein the V-beam actuators of the optical switch comprise two sets of V-beam actuators connected to each other via a link beam and located at one side of said shutter beam, and each V-beam actuator set has opposite arched-direction and their arched-direction are toward each other.

18. The optical switch as claimed in claim 13, wherein the operation state of the optical switch regarding input optical signals is transmitted forward to output channels at the initial state and switch-off state for said optical switch, while the input optical signals is reflected by said reflective mirror shutter toward output channels at the second stable state and switch-on state for said optical switch.

19. The optical switch as claimed in claim 13, wherein the operation state of said optical switch regarding input optical signals is reflected by said reflective mirror shutter toward output channels at the initial state and switch-off state for the optical switch, while the input optical signals is transmitted forward to output channels at the second stable state and switch-on state for the optical switch.

* * * * *